Patented Feb. 25, 1941

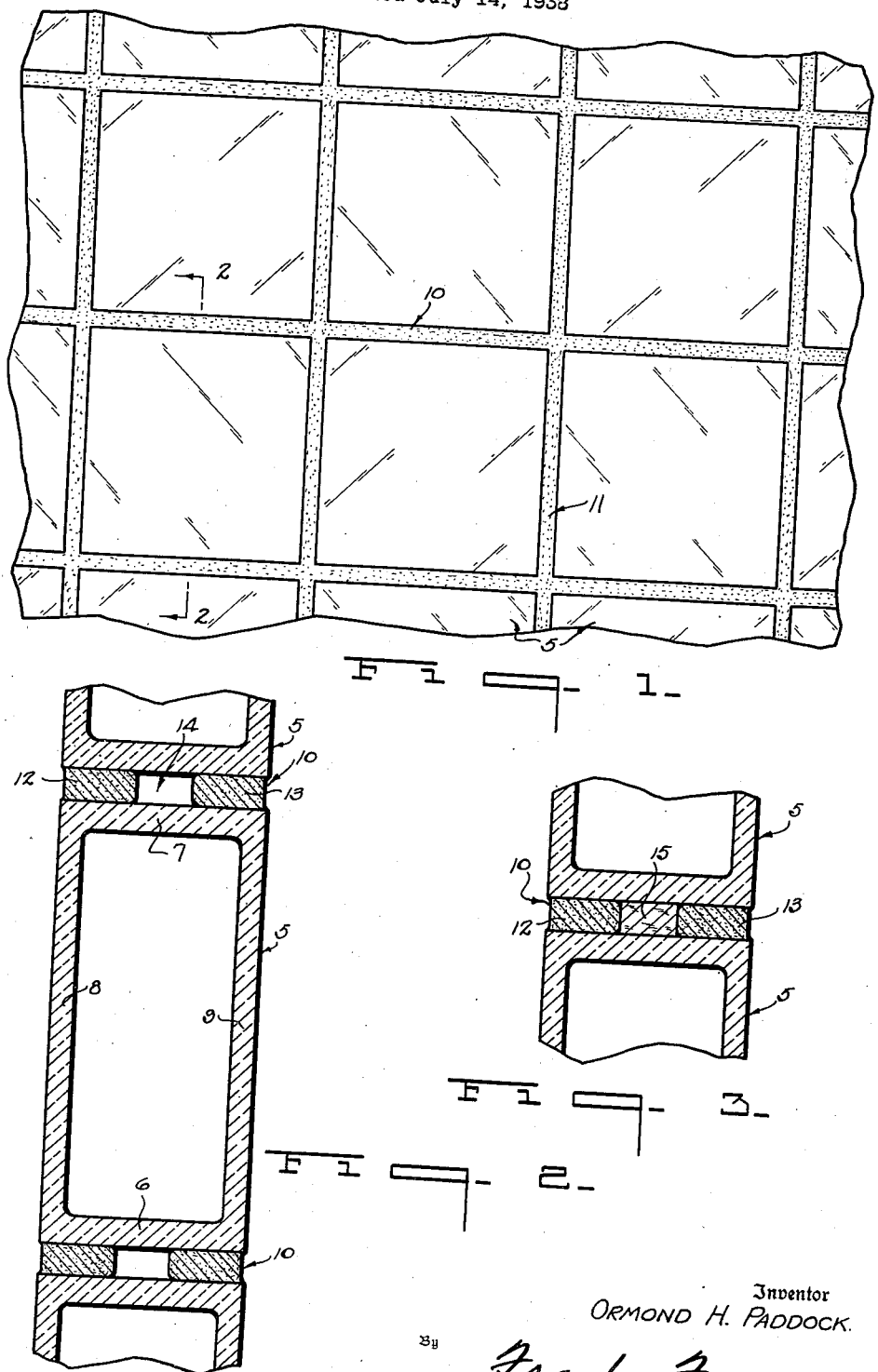

2,232,798

UNITED STATES PATENT OFFICE 2,232,798

WALL CONSTRUCTION

Ormond H. Paddock, Toledo, Ohio, assignor to Libbey-Owens-Ford Glass Company, Toledo, Ohio, a corporation of Ohio Application July 14, 1938, Serial No. 219,122

2 Claims. (Cl. 72—41)

The present invention relates to improvements in wall construction, and more particularly to the making of a wall composed of hollow glass building blocks.

When building a wall of hollow glass blocks, the blocks are set one upon the other with a layer of cement mortar between the horizontal edges of vertically adjacent blocks and also between the vertical edges of horizontally adjacent blocks. Heretofore, the cement mortar has extended from the outer face of the wall to the inner face thereof or, in other words, the width of the layer of mortar has been substantially equal to the thickness of the blocks. The cement mortar used in mounting the glass blocks is a good conductor of heat whereas the blocks themselves are a poor conductor. As a consequence, heat is conducted from the inner face of the wall to the outer face thereof through the cement mortar much more rapidly than through the glass blocks. This relatively rapid transmission of heat through the mortar results in the mortar being maintained at substantially the same temperature from the outer face of the wall to the inner face thereof and which temperature is ordinarily relatively lower than the temperature of the inner faces of the glass blocks. Since the cement mortar is relatively cooler than the inner faces of the glass blocks, the mortar is caused to contract to a greater extent than the blocks and this condition is accentuated by the fact that the cement mortar has a higher coefficient of expansion and contraction than the glass blocks. As the cement mortar completely surrounds each glass block in the form of continuous band, the contraction of this band of mortar will place a decided strain or binding action upon the block which frequently results in the cracking or fracturing of said block, especially the inner face thereof.

It is an aim of this invention to provide a wall construction of the above character wherein the glass blocks are mounted relative to one another in a novel manner to reduce to a minimum, if not entirely eliminate, the cracking of the blocks, and particularly the inner faces thereof, upon expansion and contraction of the blocks and cement mortar. This is accomplished by setting the glass blocks in such a way that the expansion and contraction of the cement mortar and blocks is more nearly equalized. To this end, the bed of mortar between the edges of adjacent blocks does not extend from one face of the wall to the opposite face thereof but instead is arranged to form two spaced layers located adjacent the inner and outer faces of the blocks and spaced from one another to provide an insulating space therebetween. This space can be left vacant or it can be filled with a suitable insulating material, such as cork or the like, if preferred. The provision of a dead air space or insulating material between the two layers of cement mortar will materially reduce the transmission of heat through the mortar from the inner face of the wall to the outer face thereof so that the temperature of the inner and outer layers of mortar will be more nearly the same as the temperature of the inner and outer faces respectively of the glass blocks. In this way, relative expansion and contraction between the cement mortar and glass blocks will be reduced to a minimum so that the strain placed upon the blocks by contraction of the surrounding mortar will be materially lessened, thereby avoiding fracturing of the glass.

Other objects and advantages of the invention will become more apparent during the course of the following description, when taken in connection with the accompanying drawing.

In the drawing, wherein like numerals are employed to designate like parts throughout the same:

Fig. 1 is a face view of a wall constructed of hollow glass building blocks in accordance with the invention;

Fig. 2 is a vertical transverse section through the wall taken substantially on line 2—2 of Fig. 1; and Fig. 3 is a view similar to Fig. 2 but showing a modified arrangement.

With reference to the drawing, there is disclosed in Fig. 1 a portion of a wall constructed of hollow glass blocks 5 mounted in accordance with the present invention. The glass blocks are shown as being substantially rectangular and each comprises, as illustrated in Fig. 2, a bottom wall 6, top wall 7, and inner and outer side walls 8 and 9 respectively. The block is also preferably closed at its opposite ends to form a hollow building unit. It is to be understood that the invention is not restricted to the use of any particular type of glass block nor to any particular method of forming the same. Also, that the blocks may be of any desired shape and size.

In making the wall in Fig. 1, the glass blocks 5 are mounted one upon the other and also side by side to provide a plurality of vertical and horizontal rows. Interposed between the horizontal edges of vertically adjacent blocks is a bed of cement mortar 10, while a similar bed of cement mortar 11 is arranged between the vertical edges of horizontally adjacent blocks. As a result, the cement mortar completely surrounds each block in the form of a continuous band.

As explained above, the cement mortar is a good conductor of heat whereas the glass blocks are a poor conductor and that due to the relatively rapid transmission of heat through the mortar the said mortar is maintained at substantially the same temperature from the outer face of the wall to the inner face thereof, while the inner faces of the glass blocks are ordinarily of a relatively higher temperature than the outer faces thereof and also at a higher temperature than the cement mortar. The cement mortar therefore contracts to a relatively greater degree than the glass blocks, which places a severe strain upon the blocks tending to cause the facture thereof. To overcome this difficulty, the cement mortar 10 and 11 arranged between the horizontal and vertical edges of the glass blocks 5 does not extend from the outer face of the wall to the inner face thereof but instead, as shown in Fig. 2, the mortar is arranged to form two transversely spaced inner and outer layers 12 and 13 respectively, said layers being located adjacent the inner and outer faces of the blocks and spaced from one another to provide an insulating space 14 therebetween. In other words, a dead air space 14 is formed between the glass blocks intermediate the inner and outer faces thereof and closed at its opposite sides by the layers of cement mortar 12 and 13.

The provision of the insulating space 14 greatly retards the conduction of heat from the inner face of the wall to the outer face thereof through the cement mortar and, as a result, the inner and outer layers 12 and 13 of mortar will be maintained at a temperature more nearly the same as the temperature of the inner and outer faces of the glass blocks. Due to such an arrangement, the contraction and expansion of the cement mortar and glass blocks will be more nearly equalized so that the strain placed upon the blocks by contraction of the mortar will be reduced to a minimum, thereby lessening to a considerable degree the danger of fracture thereof.

With the present methods of mounting glass blocks, there is also a tendency for moisture to condense upon the inner edges of the cement mortar joints before it occurs on the inner faces of the glass blocks. The provision of the insulating space 14 between the layers of cement mortar 12 and 13 will also serve to reduce this tendency towards the condensation of moisture upon the inner edges of the mortar joints.

Instead of leaving the space 14 between the layers of cement mortar 12 and 13 vacant, as in Fig. 2, the said space may be filled with a suitable insulating material 15 as shown in Fig. 3, if desired. This insulation may consist of a cork strip or may be of any other suitable material having the desired insulating properties.

Although I have referred specifically throughout the specification to the use of cement mortar between the glass blocks; it will be appreciated that the invention is not restricted thereto and that other types of mortar or plastic cements might be used. Consequently, the term "cementitious material" as employed in the claims is intended to cover any kind of material suitable for this purpose.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A wall composed of hollow glass building blocks laid one upon the other, each block having substantially flat, imperforate top and bottom and opposite end walls, and a bed of cementitious material arranged between the blocks in the form of two layers located adjacent the inner and outer faces of said blocks and entirely separated from one another at substantially the transverse centers of the said blocks to provide an insulating space therebetween, said layers of cementitious material completely surrounding each block in the form of continuous bands.

2. A wall composed of hollow glass building blocks laid one upon the other, each block having substantially flat, imperforate top and bottom and opposite end walls, a bed of cementitious material arranged between the blocks in the form of two layers located adjacent the inner and outer faces of said blocks and entirely separated from one another at substantially the transverse centers of the said blocks, said layers of cementitious material completely surrounding each block in the form of cementitious bands, and an insulating material disposed within the space between said layers of cementitious material.

ORMOND H. PADDOCK.